(12) United States Patent
Cao et al.

(10) Patent No.: US 10,956,428 B2
(45) Date of Patent: Mar. 23, 2021

(54) DATABASES AND FILE MANAGEMENT SYSTEMS AND METHODS FOR PERFORMING A LIVE UPDATE OF A GRAPHICAL USER INTERFACE TO BOOST ONE OR MORE ITEMS

(71) Applicant: WAL-MART STORES, INC., Bentonville, AR (US)

(72) Inventors: Ning Cao, Sunnyvale, CA (US); Wei Zhang, Mountain View, CA (US); Jufang Wang, San Jose, CA (US)

(73) Assignee: WALMART APOLLO LLC, Bentonville, AR (US)

( * ) Notice: Subject to any disclaimer, the term of this patent is extended or adjusted under 35 U.S.C. 154(b) by 435 days.

(21) Appl. No.: 15/884,266

(22) Filed: Jan. 30, 2018

(65) Prior Publication Data

US 2019/0236158 A1  Aug. 1, 2019

(51) Int. Cl.
*G06Q 30/00* (2012.01)
*G06F 16/2457* (2019.01)
*G06F 16/248* (2019.01)
*G06F 16/9535* (2019.01)
*G06Q 30/06* (2012.01)

(52) U.S. Cl.
CPC ...... *G06F 16/24578* (2019.01); *G06F 16/248* (2019.01); *G06F 16/9535* (2019.01); *G06Q 30/0631* (2013.01); *G06Q 30/0625* (2013.01); *G06Q 30/0641* (2013.01)

(58) Field of Classification Search
CPC ............... G06F 16/00; G06F 16/24578; G06F 16/2455; G06F 16/9038; G06F 16/23; G06F 16/435; G06F 16/583; G06F 16/3331; G06F 16/338; G06F 16/245; G06F 16/248;

(Continued)

(56) References Cited

U.S. PATENT DOCUMENTS 8,595,228 B1 * 11/2013 Horling ............. G06F 16/90324
707/733
8,635,212 B1 * 1/2014 Bunn ................... G06F 16/9535
707/723

(Continued)

FOREIGN PATENT DOCUMENTS

CN  104199985 B * 1/2018 ............. G06F 17/30
EP  2393303 A1 * 12/2011 ........... H04N 21/454

*Primary Examiner* — Augustine K. Obisesan
(74) *Attorney, Agent, or Firm* — Bryan Cave Leighton Paisner LLP

(57) ABSTRACT

Databases and file management systems and methods including one or more processors and one or more non-transitory computer-readable media computing instructions are configured to run on the one or more processors and perform acts of receiving a search query from a user electronic device, facilitating a search of a database comprising item records for multiple items of an online retailer related to the search query, receiving search results from the search of the database, facilitating inserting, according to a set of rules, the first item into the predetermined range of the ranked order of the set of items of the search results, and coordinating displaying the search results on a graphical user interface of the user electronic device with the first item listed in the predetermined range of the ranked order of the set of items of the search results. Additional embodiments are disclosed herein.

20 Claims, 6 Drawing Sheets

(58) Field of Classification Search
CPC ........... G06F 16/90335; G06F 16/9535; G06F 16/9538; Y10S 707/99933; Y10S 707/99937
See application file for complete search history.

(56) References Cited

U.S. PATENT DOCUMENTS

| | | | | |
|---|---|---|---|---|
| 9,542,335 | B1* | 1/2017 | Elving | G06F 12/121 |
| 2002/0169760 | A1* | 11/2002 | Cheung | G06F 16/951 |
| 2005/0004835 | A1* | 1/2005 | Roslansky | G06Q 30/0256 705/14.54 |
| 2008/0270389 | A1* | 10/2008 | Jones | H04L 67/30 |
| 2011/0191327 | A1* | 8/2011 | Lee | G06F 16/00 707/723 |
| 2011/0296463 | A1* | 12/2011 | Suslov | H04N 7/173 725/44 |
| 2014/0289210 | A1* | 9/2014 | Taank | G06F 16/951 707/706 |
| 2015/0066973 | A1* | 3/2015 | Kim | G06F 16/9535 707/766 |
| 2015/0293993 | A1* | 10/2015 | Anjum | G06F 16/3326 707/749 |
| 2017/0116341 | A1* | 4/2017 | Wenger | G06F 16/9535 |
| 2018/0293321 | A1* | 10/2018 | Goldberg | G06F 16/9535 |
| 2019/0258628 | A1* | 8/2019 | Roustant | G06F 16/248 |

\* cited by examiner

400

| 405 – Receiving a search query from a user electronic device. |

| 410 – Facilitating a search of a database comprising item records for multiple items of an online retailer related to the search query. |

| 415 – Receiving search results from the search of the database. |

| 420 – Determining if a first item of the multiple items is listed in a predetermined range of the ranked order of the set of items of the search results. |

| 425 – Facilitating inserting the first item into the predetermined range of the ranked order of the set of items of the search results. |

| 430 – Coordinating displaying the search results on the user electronic device with the first item listed in the predetermined range of the ranked order of the set of items of the search results. |

FIG. 4

DATABASES AND FILE MANAGEMENT SYSTEMS AND METHODS FOR PERFORMING A LIVE UPDATE OF A GRAPHICAL USER INTERFACE TO BOOST ONE OR MORE ITEMS

TECHNICAL FIELD

This disclosure relates generally to databases and file management systems and methods for performing a live update of a graphical user interface to boost one or more items in search results.

BACKGROUND

Retailers often desire to promote new and/or certain items. In order to promote new and/or certain items, conventional systems require a system administrator of the retailer to shut down all the computer servers processing search queries received from customers over the Internet, update a configuration for promoting the new and/or certain items, and restart all the computer servers processing the search queries. This process slows the overall performance of the computer system of the retailer, and also slows production of search results for displaying to users on a graphical user interface.

BRIEF DESCRIPTION OF THE DRAWINGS

To facilitate further description of the embodiments, the following drawings are provided in which:

FIG. 4 is a flowchart for a method, according to certain embodiments;

Figure 1:
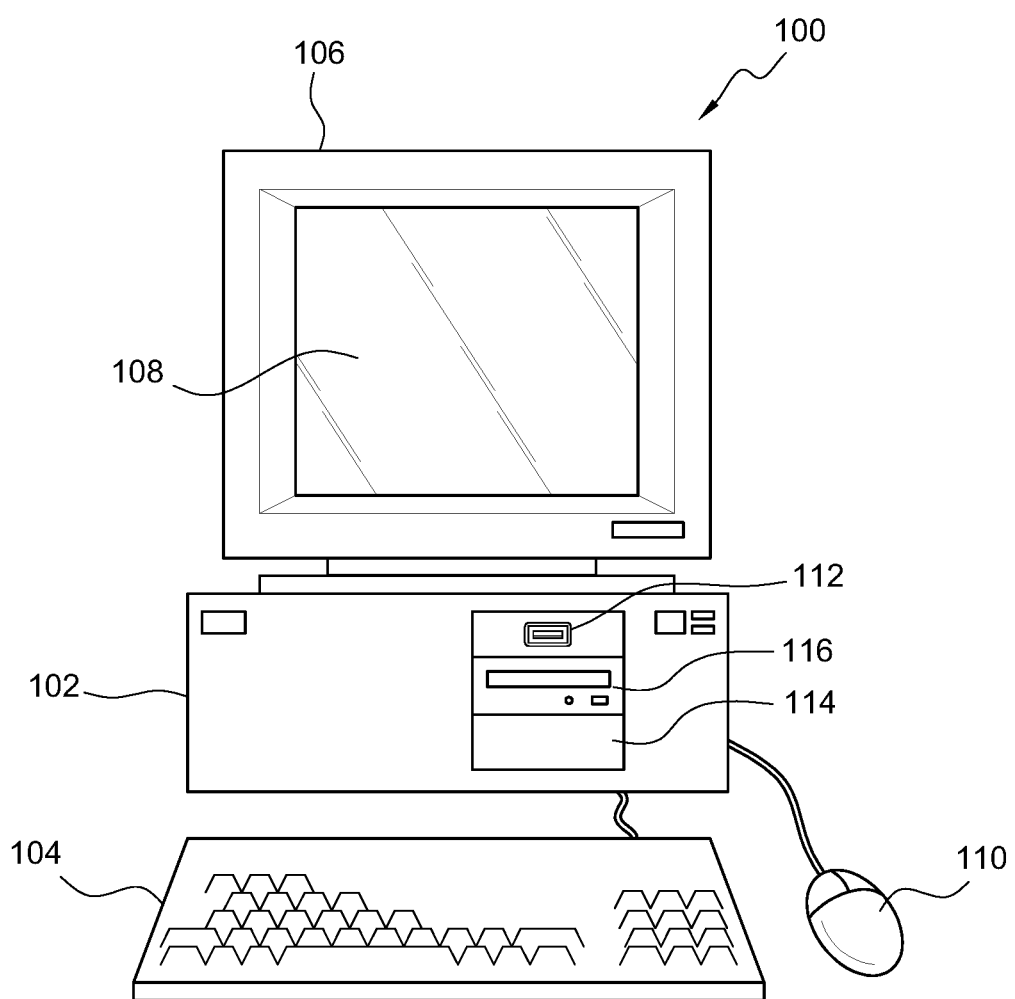
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storing computing instructions configured to run on the one or more processors. The one or more computer-readable media can be configured to run on the one or more processors and perform an act of receiving a search query from a user electronic device. The one or more computer-readable media can be further configured to run on the one or more processors and perform an act of facilitating a search of a database comprising item records for multiple items of an online retailer related to the search query. The one or more computer-readable media can be further configured to run on the one or more processors and perform an act of receiving search results from the search of the database. The search results can comprise, in a ranked order, a set of items of the multiple items of the online retailer related to the search query. The one or more computer-readable media can be further configured to run on the one or more processors and perform an act of determining if a first item of the multiple items is listed in a predetermined range of the ranked order of the set of items of the search results. The one or more computer-readable media can be further configured to run on the one or more processors and perform an act of, if the first item of the multiple items is not listed in the predetermined range of the ranked order of the set of items of the search results, facilitating inserting, according to a set of rules, the first item into the predetermined range of the ranked order of the set of items of the search results. The one or more computer-readable media can be further configured to run on the one or more processors and perform an act of coordinating displaying the search results on a graphical user interface of the user electronic device with the first item listed in the predetermined range of the ranked order of the set of items of the search results.

Various embodiments include a method. The method can include receiving a search query from a user electronic device. The method also can include facilitating a search of a database comprising item records for multiple items of an online retailer related to the search query. The method also can include receiving search results from the search of the database. The search results can comprise, in a ranked order, a set of items of the multiple items of the online retailer related to the search query. The method also can include determining if a first item of the multiple items is listed in a predetermined range of the ranked order of the set of items of the search results. The method also can include, if the first item of the multiple items is not listed in the predetermined range of the ranked order of the set of items of the search results, facilitating inserting, according to a set of rules, the first item into the predetermined range of the ranked order of the set of items of the search results. The method also can include coordinating displaying the search results on a graphical user interface of the user electronic device with the first item listed in the predetermined range of the ranked order of the set of items of the search results.

Various embodiments include a method. The method can include receiving, at a front end server, a search query from a user electronic device. The method also can include transmitting, by the front end server, the search query to a first processor of a set of processors. The method also can include facilitating, by the first processor, a search of a database comprising item records for multiple items of an online retailer related to the search query. The method also can include receiving, at the first processor, search results from the search of the database. The search results can comprise, in a ranked order, a set of items of the multiple items of the online retailer related to the search query. The method also can include determining, at the first processor, if a first item of the multiple items is listed in a predetermined range of the ranked order of the set of items of the search results. The method also can include, if the first item of the multiple items is not listed in the predetermined range of the ranked order of the set of items of the search results, facilitating inserting, at the first processor and according to a set of rules, the first item into the predetermined range of the ranked order of the set of items of the search results. The method also can include transmitting, from the first processor to the front end server, the search results with the first item listed in the predetermined ranged of the ranged order of the set of items of the search results. The method also can include coordinating displaying, by the front end server, the search results on a graphical user interface of the user electronic device with the first item listed in the predetermined range of the ranked order of the set of items of the search results.

Figure 2:
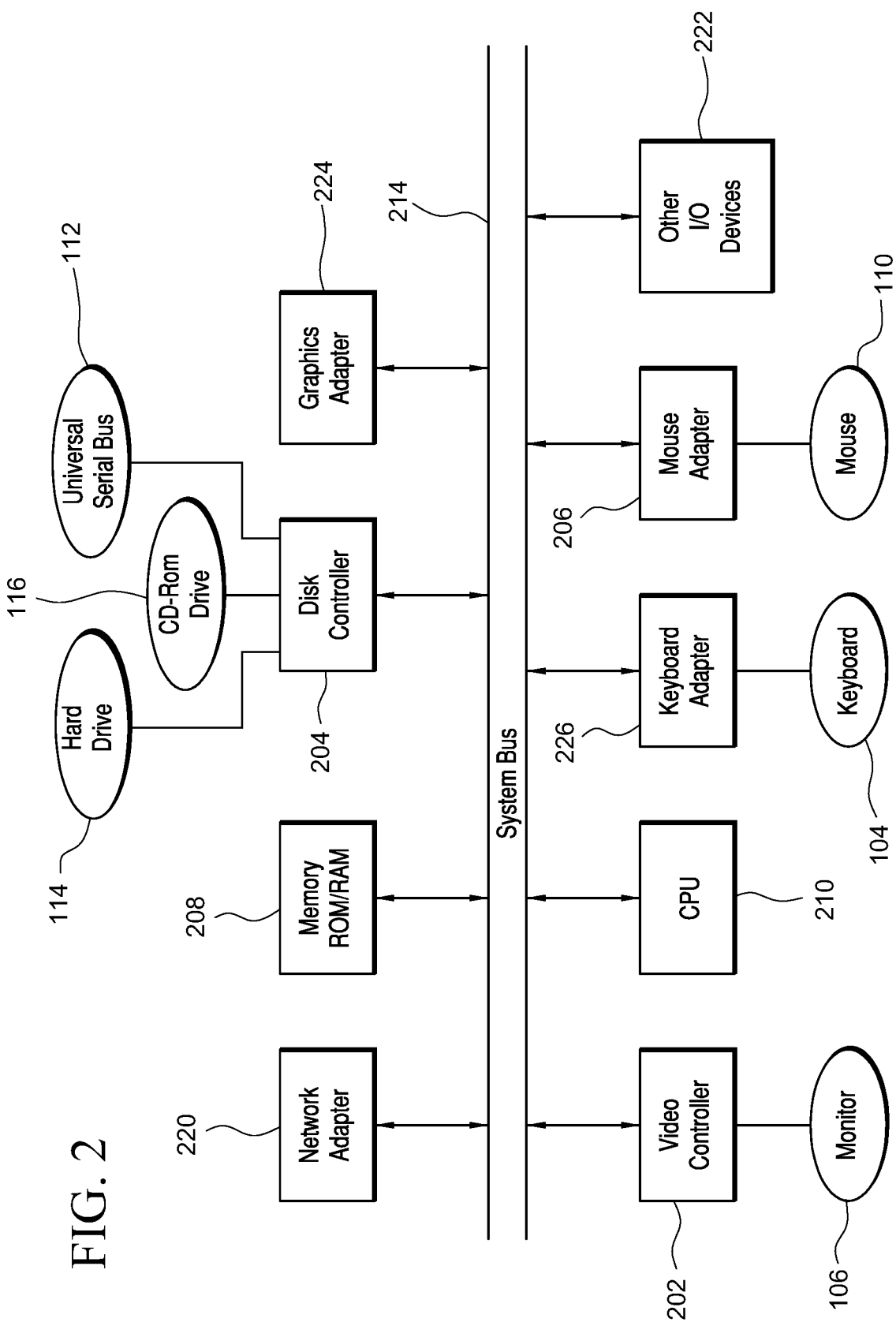
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
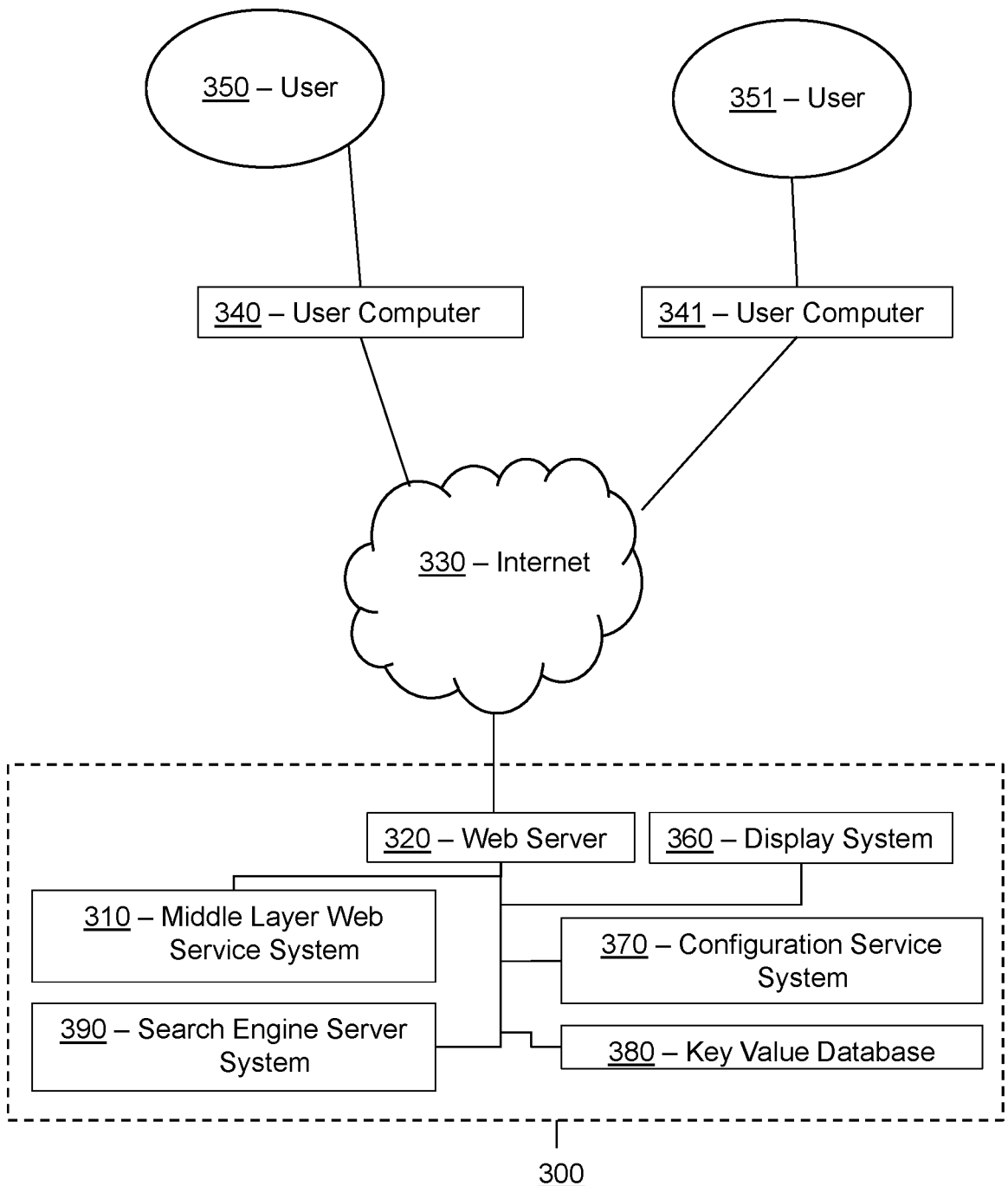
FIG. 3 illustrates a representative block diagram of a system, according to an embodiment.

Turning ahead in the drawings, FIG. 3 illustrates a block diagram of a system 300 that can be employed for performing a live update of web service systems to boost one or more items, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a middle layer web service system 310, a web server 320 (or front end server), a display system 360, a configuration service system 370, a key value database 380, and/or a search engine server system 390. Middle layer web service system 310, web server 320, display system 360, configuration service system 370, key value database 380, and/or search engine server system 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of middle layer web service system 310, web server 320, display system 360, configuration service system 370, key value database 380, and/or search engine server system 390. Additional details regarding middle layer web service system 310, web server 320, display system 360, configuration service system 370, key value database 380, and/or search engine server system 390 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host a website that allows users to browse and/or search for products, to add products to an electronic shopping cart, and/or to purchase products, in addition to other suitable activities.

In many embodiments, middle layer web service system 310, web server 320, display system 360, configuration service system 370, key value database 380, and/or search engine server system 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) middle layer web service system 310, web server 320, display system 360, configuration service system 370, key value database 380, and/or search engine server system 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of middle layer web service system 310, web server 320, display system 360, configuration service system 370, key value database 380, and/or search engine server system 390. In a similar manner, the processing module(s) and the memory storage module(s) can be local and/or remote to each other.

In many embodiments, middle layer web service system 310, web server 320, display system 360, configuration service system 370, key value database 380, and/or search engine server system 390 can be configured to communicate with one or more user computers 340 and 341. In some embodiments, user computers 340 and 341 also can be referred to as customer computers. In some embodiments, middle layer web service system 310, web server 320, display system 360, configuration service system 370, key value database 380, and/or search engine server system 390 can communicate or interface (e.g., interact) with one or more customer computers (such as user computers 340 and 341) through a network or internet 330. Internet 330 can be an intranet that is not open to the public. Accordingly, in many embodiments, middle layer web service system 310, web server 320, display system 360, configuration service system 370, key value database 380, and/or search engine server system 390 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, middle layer web service system 310, web server 320, display system 360, configuration service system 370, key value database 380, and/or search engine server system 390 also can be configured to communicate with one or more databases or electronic file management systems. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases or electronic file management systems can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between middle layer web service system 310, web server 320, display system 360, configuration service system 370, key value database 380, and/or search engine server system 390, and/or the one or more databases or electronic file management systems can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
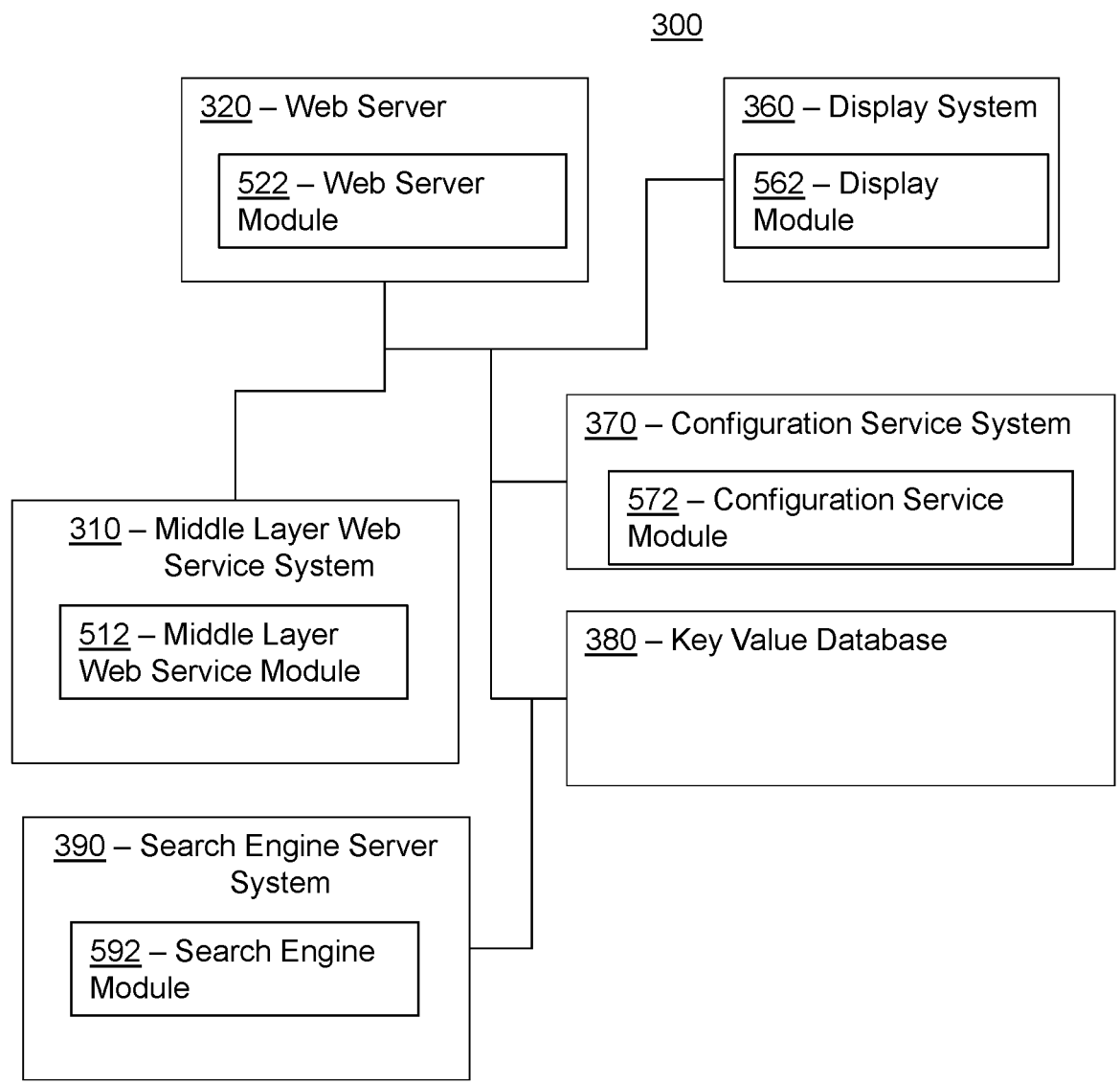
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 522, 562, 572, and/or 592 (FIG. 5). Such non-transitory memory storage modules can be part of a computer system such as middle layer web service system 310, web server 320, display system 360, configuration service system 370, key value database 380, and/or search engine server system 390 (FIGS. 3 & 5). The processing module(s) can be similar or identical to the processing module(s) described above with respect to computer system 100 (FIG. 1).

In many embodiments, method 400 can comprise an activity 405 of receiving a search query from a user electronic device. In some embodiments, activity 405 can comprise receiving, at a front end server, such as but not limited to web server 320 (FIG. 3), a search query from a user electronic device. The search query can comprise (1) an original query, such as "iPhone," (2) a stemmed query, such as "flawless hair remover," and/or (3) a browse category command.

In some embodiments, method 400 also can comprise an activity of transmitting, by a front end server, the search query to a first processor of a set of processors. For example, in some embodiments, method 400 can optionally comprise an activity of transmitting, by web server 320 (FIG. 3), the search query to middle layer web service system 310 (FIG. 3).

In many embodiments, method 400 can comprise an activity 410 of facilitating a search for multiple items of an online retailer related to the search query. The search facilitated can be for multiple items of a database or electronic file management system comprising item records of the online retailer. For example, a database or electronic file management system can store item records for one or more online retailers, and middle layer web service system 310 (FIG. 3) can facilitate a search of the database storing the item records for the one or more online retailers. More particularly, middle layer web service system 310 (FIG. 3) can facilitate the search for multiple items of the database comprising item records of one or more online retailers by transmitting the search to a backend server, such as but not limited to search engine server system 390 (FIG. 3), and the backend server can the perform a search of the database comprising item records of one or more online retailers.

In some embodiments, activity 415 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

In many embodiments, method 400 can comprise an activity 415 of receiving search results from the search of the database or electronic file management system. In a more particular example, activity 415 can comprise receiving, at the first processor, such as but not limited to middle layer web service system 310 (FIG. 3), search results from the search of the database. The search results can comprise, in a ranked order, a set of items of the multiple items of the online retailer. In some embodiments, search engine server system 390 (FIG. 3) can transmit or otherwise communicate the search results to middle layer web service system 310 (FIG. 3)

In many embodiments, method 400 can comprise an activity 420 of determining if a first item of the multiple items is listed in a predetermined range of the ranked order of the set of items of the search results. In a more particular example, activity 420 can comprise determining, at a first processor, such as but not limited to middle layer web service system 310 (FIG. 3), if a first item of the multiple items is listed in a predetermined range of the ranked order of the set of items of the search results. For example activity, the search results can include a set of 100 items in a ranked order from #1 to #100. System 300 (FIG. 3), or more particularly, middle layer web service system 310 (FIG. 3), can determine if a particular item is ranked #1 through #5 (i.e., #1, #2, #3, #4, or #5) in the ranked order of the set of 100 items. The particular item can, for example, be a new item or an item the online retailer desires to promote. In some embodiments, activity 420 can include determining if several items of the multiple items are listed in a predetermined range of the ranked order of the set of items of the search results, where the several items include the first item.

In many embodiments, method 400 can comprise, if the first item of the multiple items is not listed in the predetermined range of the ranked order of the set of items of the search results, an activity 425 of facilitating inserting the first item into the predetermined range of the ranked order of the set of items of the search results. In a more particular example, activity 425 can comprise facilitating inserting, at middle layer web service system 310 (FIG. 3) and according to a set of rules, the first item into the predetermined range of the ranked order of the set of items of the search results. For example, if a new item is not ranked #1 through #5 in the ranked order of the set of 100 items, middle layer web service system 310 (FIG. 3) can facilitate insertion, according to a set of rules, of the new item into #1 through #5 of the ranked order of the set of 100 items before search results are displayed on a graphical user interface of the electronic device of the user. In some embodiments, when activity 420 involves the several items of the multiple items and when one or more of the several items of the multiple items are not listed in the predetermined range of the ranked order of the set of items of the search results, then the activity 425 can include facilitating inserting the one or more of the several items into the predetermined range of the ranked order of the set of items of the search results, where the one or more of the several items include the first item.

The set of rules that system 300 (FIG. 3) uses to determine positioning of the first item in the predetermined range can vary according to different embodiments. For example, in some embodiments, method 400 can optionally comprise an activity of determining if a current time is after a predetermined start time and before a predetermined end time for inserting the first item into the predetermined range of the ranked order of the set of items of the search results. If the current time is after the predetermined start time and before the predetermined end time for inserting the first item into the predetermined range of the ranked order of the set of items of the search results, then method 400 can comprise facilitating inserting the first item into the predetermined range of the ranked order of the set of items of the search results. For example, if an online retailer desires to promote a certain item but only for a limited, predetermined time, the set of rules can include a predetermined start time and a predetermined end time for promoting the certain item. If a current time of the search query falls between the predetermined start time and the predetermined end time, then middle layer web service system 310 (FIG. 3) can facilitate inserting the certain item into the predetermined range according to the set of rules. If the current time of the search query does not fall between the predetermined start time and the predetermined end time, then the promotion has ended, and middle layer web service system 310 (FIG. 3) does not facilitate inserting the certain item into the predetermine range according to the set of rules.

In some embodiments, activity 425 can comprise facilitating inserting the first item into a predetermined position in the predetermined range of the ranked order of the set of items of the search results. For example, an online retailer can desire an item be inserted into the #1 position in the ranked order of a set of 100 items in the search results. At other times, the online retailer can desire the item be inserted into the #3 position in the ranked order of the set of 100 items in the search results. Moreover, in some embodiments, more than one item can be inserted into the predetermined range of the ranked order of the set of items. In these and other embodiments, the online retailer can, according to the set of rules, insert a first item into the #1 position and a second item into the #3 position in the ranked order of the set of 100 items in the search results.

In some embodiments, method 400 can optionally comprise an activity of determining if the first item satisfies one or more facet requirements of the search query. For example, the search query can comprise facet requirements of brand, color, and/or size. Middle layer web service system 310 (FIG. 3) can, according to the set of rules, determine if the first (or promoted/boosted) item satisfies the facet requirements of brand, color, and/or size in the search query. If the first item satisfies the one or more facet requirements of the search query, activity 425 can comprise facilitating inserting the first item into the predetermined range of the ranked order of the set of items of the search results. If the first item does not satisfy the one or more facet requirements of the search query, middle layer web service system 310 (FIG. 3) does not facilitate inserting the first item into the predetermined range of the ranked order of the set of items of the search results.

In some embodiments, if the first item of the multiple items is listed in the predetermined range of the ranked order of the set of items of the search results, method 400 can optionally comprise an activity of determining if the first item of the multiple items is listed before a predetermined position in the predetermined range of the ranked order of the set of items of the search results. For example, middle layer web service system 310 (FIG. 3) can determine that a new item is to be positioned at predetermined position #3 in a predetermined range of #1 through #5 in the ranked order of the set of items of the search results according to the set of rules, and the new item is listed at #4 in the ranked order of search results received by middle layer web service system 310 (FIG. 3). If the first item of the multiple items is listed in the predetermined range of the ranked order but is not listed before the predetermined position in the predetermined range of the ranked order of the set of items of the search results, activity 425 can comprise facilitating inserting the first item into the predetermined position in the predetermined range of the ranked order of the set of items of the search results. For example, middle layer web service system 310 (FIG. 3) can insert the new item at the predetermined position #3 in the predetermined range of #1 through #5 when the new item was originally listed at #4 in the ranked order of search results.

In some implementations, however, middle layer web service system 310 (FIG. 3) can determine that a new item is to be positioned at a predetermined position #3 in the ranked order of the set of items of the search results according to the set of rules, but the new item is already listed at #2 in search results received by middle layer web service system 310 (FIG. 3). If middle layer web service system 310 (FIG. 3) determines that a new item is to be positioned at #3 in the ranked order of the set of items of the search results according to the set of rule, but the new item is already listed at #2 in search results received by middle layer web service system 310 (FIG. 3), then middle layer web service system 310 does not facilitate inserting the new item into the predetermined position #3 because this will position the new item lower in the search results displayed to the user.

In many embodiments, method 400 can comprise an activity 430 of coordinating displaying the search results on a graphical user interface of the user electronic device with the first item listed in the predetermined range of the ranked order of the set of items of the search results. In more particular embodiments, activity 430 can comprise coordinating displaying, by a front end server, such as but not limited to web server 320 (FIG. 3), the search results on a graphical user interface of the user electronic device with the first item listed in the predetermined range of the ranked order of the set of items of the search results. In some embodiments, if activity 420 involves the several items of the multiple items, then the activity 430 can include coordinating displaying the search results on a graphical user interface of the user electronic device with the several items listed in the predetermined range of the ranked order of the set of items of the search results, where the several items include the first item.

In many embodiments, method 400 can be performed using multiple processors or a set of processors. For example, the multiple processors can comprise multiple middle layer web service systems 310 (such as non-limiting system 600 shown in FIG. 3). In these and other embodiments, activity 405 can comprise receiving, on a first processor of the multiple processors, search query from the user electronic device; activity 410 can comprise facilitating, with the first processor of the multiple processors, the search of the database comprising the item records for the multiple items of the online retailer related to the search query; activity 415 can comprise receiving, on the first processor of the multiple processors, the search results from the search of the database; activity 420 can comprise determining, with the first processor of the multiple processors, if the first item of the multiple items is listed in the predetermined range of the ranked order of the set of items of the search results; activity 425 can comprise facilitating inserting, according to the set of rules and with the first processor of the multiple processors, the first item into the predetermined range of the ranked order of the set of items of the search results; and activity 430 can comprise coordinating displaying, with the first processor of the multiple processors, the search results on a graphical user interface of the user electronic device with the first item listed in the predetermined range of the ranked order of the set of items of the search results.

In embodiments comprising multiple processors, method 400 can optionally comprise activities of: receiving, at the first processor of the multiple processors, an updated set of rules from a configuration processor different from the multiple processors; comparing, at the first processor of the multiple processors, the updated set of rules to the set of rules to determine if the updated set of rules is different from the set of rules; and if the updated set of rules is different from the set of rules, pushing, at the first processor of the multiple processors, the updated set of rules to a key value database.

In embodiments comprising multiple processors, additional processors of the multiple processors can be updated without requiring the multiple processors to be shut down and restarted with a new configuration of the set of rules. For example, in some embodiments, method 400 can optionally comprise activities of automatically pulling, at a second processor of the multiple processors, the updated set of rules from the key value database; comparing, at the second processor of the multiple processors, the updated set of rules to the set of rules used by the second processor; and if the updated set of rules is different from the set of rules, overwriting, at the second process of the multiple processors, the set of rules with the updated set of rules on the second processor. Thus, many embodiments of method 400 solve the technological problem of updating processors without requiring an administrator to shut down processors, change the configuration of rules, and/or re-start multiple processors.

FIG. 5 illustrates a block diagram of a portion of system 300 comprising middle layer web service system 310, web server 320, display system 360, configuration service system 370, key value database 380, and search engine server system 390, according to the embodiment shown in FIG. 3. Each of middle layer web service system 310, web server 320, display system 360, configuration service system 370, key value database 380, and search engine server system 390 is merely exemplary and not limited to the embodiments presented herein. Each of middle layer web service system 310, web server 320, display system 360, configuration service system 370, key value database 380, and/or search engine server system 390 can be employed in many different embodiments or examples not specifically depicted or described herein. In some embodiments, certain elements or modules of middle layer web service system 310, web server 320, display system 360, configuration service system 370, key value database 380, and/or search engine server system 390 can perform various procedures, processes, and/or acts. In other embodiments, the procedures, processes, and/or acts can be performed by other suitable elements or modules.

In many embodiments, middle layer web service system 310 can comprise non-transitory memory storage module 512. Memory storage module 512 can be referred to as middle layer web service module 512. In many embodiments, middle layer web service module 512 can store computing instructions configured to run on one or more processing modules and perform one or more acts of method 400 (FIG. 4) (e.g., activity 410 of facilitating a search of a database comprising item records for multiple items of an online retailer related to the search query (FIG. 4), activity 415 of receiving search results from the search of the database (FIG. 4), activity 420 of determining if a first item of the multiple items is listed in a predetermined range of the ranked order of the set of items of the search results (FIG. 4), activity 425 of facilitating inserting the first item into the predetermined range of the ranked order of the set of items of the search results (FIG. 4), an activity of receiving an updated set of rules from a configuration processor different from the multiple processors, an activity of comparing the updated set of rules to the set of rules to determine if the updated set of rules is different from the set of rules, an activity of, if the updated set of rules is different from the set of rules, an activity of pushing the updated set of rules to key value database 380 (FIG. 3), an activity of automatically pulling the updated set of rules from the key value database, comparing the updated set of rules to the set of rules used, and an activity of, if the updated set of rules is different from the set of rules, overwriting the set of rules with the updated set of rules).

In many embodiments, web server 320 can comprise non-transitory memory storage module 522. Memory storage module 522 can be referred to as web server module 522. In many embodiments, web server module 522 can store computing instructions configured to run on one or more processing modules and perform one or more acts of method 400 (FIG. 4) (e.g., activity 405 of receiving a search query from a user electronic device (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 430 of coordinating displaying the search results on a graphical user interface of the user electronic device with the first item listed in the predetermined range of the ranked order of the set of items of the search results (FIG. 4)). In many embodiments, display module 562 can operate in conjunction with web server module 522 to perform an activity 430 of coordinating displaying the search results on a graphical user interface of the user electronic device with the first item listed in the predetermined range of the ranked order of the set of items of the search results.

In many embodiments, configuration service system 370 can comprise non-transitory memory storage module 572. Memory storage module 572 can be referred to as configuration service module 572. In many embodiments, configuration service module 572 can store computing instructions configured to run on one or more processing modules and perform one or more acts of method 400 (FIG. 4) (e.g. an activity of receiving an updated set of rules from a category specialist, transmitting the updated set of rules to a configuration database 672 (FIG. 6), and/or transmitting the updated set of rules to a processor, such as but not limited to middle layer web service system 310 (FIG. 3)).

In many embodiments, key value database 380 can store computing instructions configured to run on one or more processing modules and perform one or more acts of method 400 (FIG. 4) (e.g. an activity of receiving the updated set of rules pushed from a first processor, such as middle layer web service system 310 (FIG. 3), storing the updated set of rules, and transmitting the updated set of rules to a second processor when the second processor pulls the updated set of rules from key value database 380 (FIG. 3)).

In many embodiments, search engine server system 390 can comprise non-transitory memory storage module 592. Memory storage module 592 can be referred to as search engine module 592. In many embodiments, search engine module 592 can store computing instructions configured to run on one or more processing modules and perform one or more acts of method 400 (FIG. 4) (e.g., an activity of searching a database comprising item records for multiple items of an online retailer, and providing a text-match search functionality of the database in the form of search results).

Figure 6:
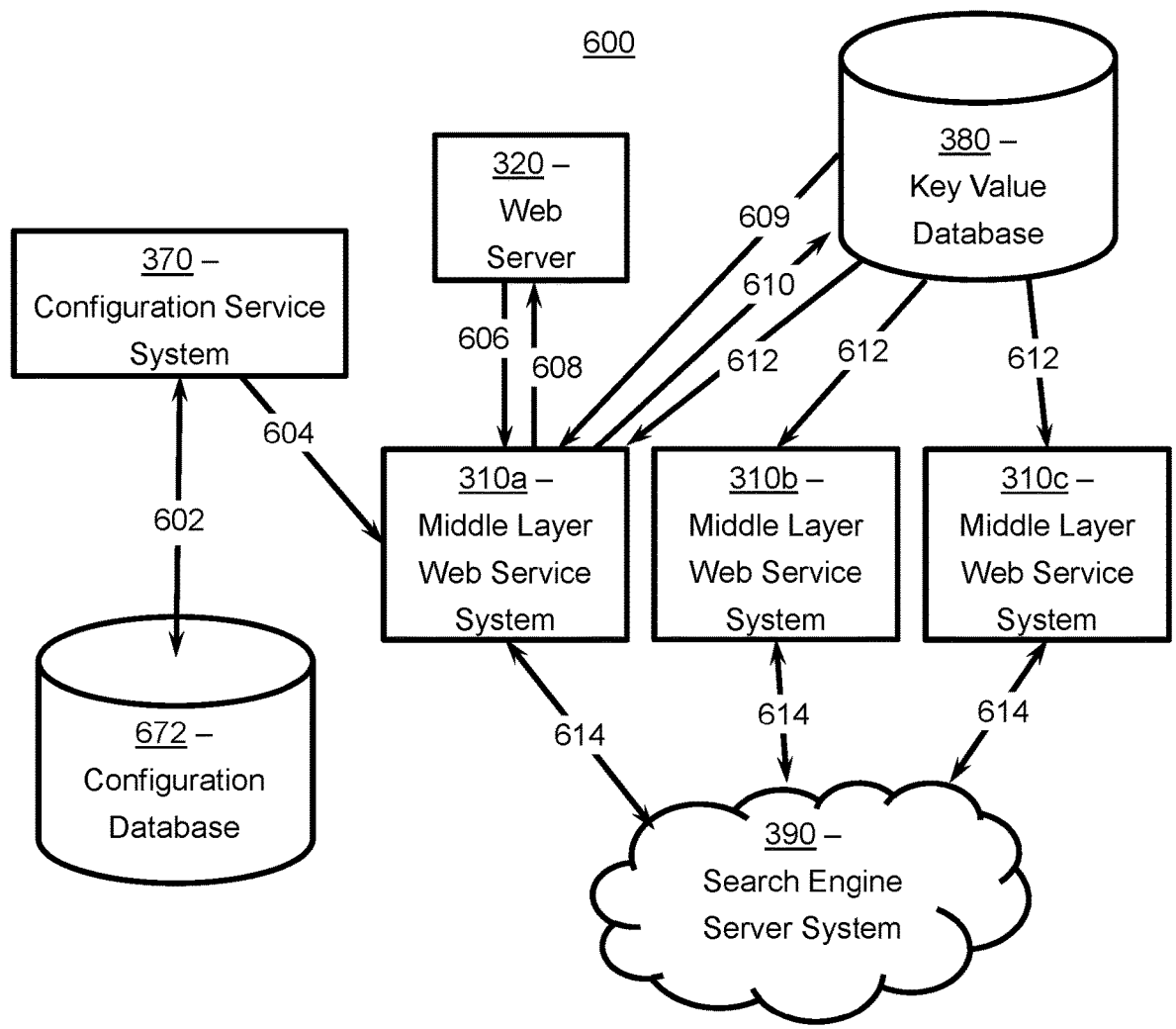
FIG. 6 illustrates a representative block diagram of a live update system, according to certain embodiments.

Turning ahead in the drawings to FIG. 6, which illustrates a representative block diagram of a live update system 600, according to certain embodiments. In many embodiments, configuration service system 370 can receive, from a category specialist, an original set of rules and one or more updated set of rules for boosting one or more items. Configuration service system 370 can comprise a configuration management service and/or tool. At 602, configuration service system 370 can communicate with a configuration database 672. Configuration database 672 can store the original set of rules and/or the one or more updated set of rules in a persistent storage.

In many embodiments, when an updated set of rules is received at configuration service system 370, configuration service system 370 can transmit, at 604 the updated set of rules to a random, first middle layer web service system 310a of multiple middle layer web service systems. Each middle layer web service system 310 of the multiple middle layer web service systems can comprise a middle layer web service between search engine server system 390 and web server 320. Each middle layer web service system 310 can be configured to handle query understanding, spellcheck, ranking of items, and any of the other activities associated with middle layer web service system 310 described herein.

Next, in many embodiments, first middle layer web service system 310a can, at 609, fetch the updated set of rules from key value database 380. Then, first middle layer web service system 310a can compare the updated set of rules received from configuration service system 370 with the updated set of rules fetched from key value database 380. If the updates sets of rules are different from each other, then, the first middle layer web service system 310a can, at 610, push the updated set of rules received from configuration services system 370 to the key value database 380 and override the updated set of rules in the key value database 380. Then, in many embodiments, at a periodic predetermined time, first middle layer web service system 310a, a second middle layer web service system 310b, a third middle layer web service system 310c, and so on, can, at 612, automatically pull the updated set of rules from key value database 380 to be stored in first middle layer web service system 310a, second middle layer web service system 310b, third middle layer web service system 310c, etc. Second middle layer web service system 310b and third middle layer web service system 310c can then, in many embodiments, compare the set of rules pulled from key value database 380 to the set of rules being used by second middle layer web service system 310b and third middle layer web service system 310c.

If, for example, the set of rules pulled from key value database 380 comprise the updated set of rule and are thus different from the initial set of rules being used by second middle layer web service system 310b and third middle layer web service system 310c, then first middle layer web service system 310a, together with second middle layer web service system 310b and third middle layer web service system 310c, can overwrite the initial set of rules with the updated set of rules in first middle layer web service system 310a, second middle layer web service system 310b, and third middle layer web service system 310c. Thus, live update system 600 diagramed in FIG. 6 solves the technological problem of updating middle layer web service systems 310 without requiring an administrator to shut down middle layer web service systems 310, changing the configuration of rules, and re-starting middle layer web service systems 310.

If the set of rules pulled from key value database are not different from the set of rules being used by second middle layer web service system 310b and third middle layer web service system 310c, then first middle layer web service system 310a, second middle layer web service system 310b, and third middle layer web service system 310c do not overwrite the set of rules being used by first middle layer web service system 310a, second middle layer web service system 310b, and third middle layer web service system 310c.

The block diagram of FIG. 6 also illustrates systems for boosting one or more items in search results. For example, in many embodiments, a search query and/or browse category command can be received from user computer 340 at web server 320. Web server 320 can comprise a front end web service configured to handle data presentation. The search query and/or browse category command can, at 606, be transmitted from web server 320 to any one of the multiple middle layer web service systems 310a, 310b, or 310c. The search query and/or browse category command can then, at 614, be transmitted from the one of the multiple middle layer web service systems 310a, 310b, or 310c to search engine server system 390. Search engine server system 390 can comprise any search engine and/or service configured to provide text-match based search functionality. Search engine server system 390 can then, at 614, communicate search results of the search query and/or browse category command to the one of the multiple middle layer web service systems 310a, 310b, or 310c. The search results, can in some embodiments, comprise a ranked order of a set of items.

In many embodiments, when the search results of the search query and/or browse category command have been communicated to the one of the multiple middle layer web service systems 310a, 310b, or 310c, the one of the multiple middle layer web service systems 310a, 310b, or 310c can determine if a first item of multiple items is listed in a predetermined range of a ranked order of the set of items of the search results. If the first item of the multiple items is not listed in the predetermined range of the ranked order of the set of items of the search results, the one of the multiple middle layer web service systems 310a, 310b, or 310c can facilitate inserting, according to the set of rules, the first item into the predetermined range of the ranked order of the set of items of the search results.

In many embodiments, when the first item has been inserted into the predetermined range of the ranked order of the set of items of the search results, the one of the multiple middle layer web service systems 310a, 310b, or 310c can, at 608, transmit the search results to web server 320 with the first item listed in the predetermined ranged of the ranged order of the set of items of the search results.

Although systems and methods for performing a live update of web service systems to boost one or more items have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system, comprising:
   one or more processors; and
   one or more non-transitory computer-readable media storing computing instructions configured to run on the one or more processors and perform:
      receiving a search query from a user electronic device;
      facilitating a search of a database comprising item records for multiple items of an online retailer related to the search query;
      receiving search results from the search of the database, the search results comprising, in a ranked order, a set of items of the multiple items of the online retailer related to the search query;
      determining when a first item of the multiple items is listed in a predetermined range of the ranked order of the set of items of the search results;
      when the first item of the multiple items is not listed in the predetermined range of the ranked order of the set of items of the search results, facilitating inserting, according to a set of rules, the first item into the predetermined range of the ranked order of the set of items of the search results;
      coordinating displaying the search results on a graphical user interface of the user electronic device with the first item listed in the predetermined range of the ranked order of the set of items of the search results;
      receiving an updated set of rules;
      comparing the updated set of rules to the set of rules to determine when the updated set of rules is different from the set of rules;
      when the updated set of rules is different from the set of rules, transmitting the updated set of rules to a key value database; and
      coordinating displaying a modified version of the search results on the graphical user interface of the user electronic device according to the updated set of rules.

2. The system of claim 1, wherein facilitating inserting, according to the set of rules, the first item into the predetermined range of the ranked order of the set of items of the search results comprises:
   determining when a current time is after a predetermined start time and before a predetermined end time for inserting the first item into the predetermined range of the ranked order of the set of items of the search results; and
   when the current time is after the predetermined start time and before the predetermined end time for inserting the first item into the predetermined range of the ranked order of the set of items of the search results, facilitating inserting the first item into the predetermined range of the ranked order of the set of items of the search results.

3. The system of claim 1, wherein facilitating inserting, according to the set of rules, the first item into the predetermined range of the ranked order of the set of items of the search results comprises:
   facilitating inserting the first item into a predetermined position in the predetermined range of the ranked order of the set of items of the search results.

4. The system of claim 1, wherein facilitating inserting, according to the set of rules, the first item into the predetermined range of the ranked order of the set of items of the search results comprises:
   determining when the first item satisfies one or more facet requirements of the search query;
   when the first item satisfies the one or more facet requirements of the search query, facilitating inserting the first item into the predetermined range of the ranked order of the set of items of the search results; and
   when the first item does not satisfy the one or more facet requirements of the search query, not facilitating inserting the first item into the predetermined range of the ranked order of the set of items of the search results.

5. The system of claim 1, wherein:
   the one or more non-transitory computer-readable media storing the computing instructions are further configured to run on the one or more processors and perform:
      when the first item of the multiple items is listed in the predetermined range of the ranked order of the set of items of the search results, determining when the first item of the multiple items is listed before a predetermined position in the predetermined range of the ranked order of the set of items of the search results; and
   facilitating inserting, according to the set of rules, the first item into the predetermined range of the ranked order of the set of items of the search results comprises:
      when the first item of the multiple items is listed in the predetermined range of the ranked order but is not listed before the predetermined position in the predetermined range of the ranked order of the set of items of the search results, facilitating inserting the first item into the predetermined position in the predetermined range of the ranked order of the set of items of the search results.

6. The system of claim 1, wherein:
   the system further comprises a software application configured to perform:
      automatically pulling the updated set of rules from the key value database; and
      when the updated set of rules is different from the set of rules, overwriting the set of rules with the updated set of rules; and
   comparing the updated set of rules to the set of rules comprises using the software application to compare the updated set of rules to the set of rules.

7. The system of claim 1, wherein:
the one or more non-transitory computer-readable media storing the computing instructions are further configured to run on the one or more processors and perform:
when the first item of the multiple items is listed in the predetermined range of the ranked order of the set of items of the search results, determining when the first item of the multiple items is listed before a predetermined position in the predetermined range of the ranked order of the set of items of the search results; and
facilitating inserting, according to the set of rules, the first item into the predetermined range of the ranked order of the set of items of the search results comprises:
determining when a current time is after a predetermined start time and before a predetermined end time for inserting the first item into the predetermined range of the ranked order of the set of items of the search results;
when the current time is after the predetermined start time and before the predetermined end time for inserting the first item into the predetermined range of the ranked order of the set of items of the search results, facilitating inserting the first item into the predetermined range of the ranked order of the set of items of the search results;
facilitating inserting the first item into the predetermined position in the predetermined range of the ranked order of the set of items of the search results;
determining when the first item satisfies one or more facet requirements of the search query;
when the first item satisfies the one or more facet requirements of the search query, facilitating inserting the first item into the predetermined range of the ranked order of the set of items of the search results;
when the first item does not satisfy the one or more facet requirements of the search query, not facilitating inserting the first item into the predetermined range of the ranked order of the set of items of the search results; and
when the first item of the multiple items is listed in the predetermined range of the ranked order but is not listed before the predetermined position in the predetermined range of the ranked order of the set of items of the search results, facilitating inserting the first item into the predetermined position in the predetermined range of the ranked order of the set of items of the search results.

8. A method being implemented via execution of computing instructions configured to run at one or more processors and configured to be stored at non-transitory computer-readable media, the method comprising:
receiving a search query from a user electronic device;
facilitating a search of a database comprising item records for multiple items of an online retailer related to the search query;
receiving search results from the search of the database, the search results comprising, in a ranked order, a set of items of the multiple items of the online retailer related to the search query;
determining when a first item of the multiple items is listed in a predetermined range of the ranked order of the set of items of the search results;
when the first item of the multiple items is not listed in the predetermined range of the ranked order of the set of items of the search results, facilitating inserting, according to a set of rules, the first item into the predetermined range of the ranked order of the set of items of the search results;
coordinating displaying the search results on a graphical user interface of the user electronic device with the first item listed in the predetermined range of the ranked order of the set of items of the search results;
receiving an updated set of rules;
comparing the updated set of rules to the set of rules to determine when the updated set of rules is different from the set of rules;
when the updated set of rules is different from the set of rules, transmitting the updated set of rules to a key value database; and
coordinating displaying a modified version of the search results on the graphical user interface of the user electronic device according to the updated set of rules.

9. The method of claim 8, wherein facilitating inserting, according to the set of rules, the first item into the predetermined range of the ranked order of the set of items of the search results comprises:
determining when a current time is after a predetermined start time and before a predetermined end time for inserting the first item into the predetermined range of the ranked order of the set of items of the search results; and
when the current time is after the predetermined start time and before the predetermined end time for inserting the first item into the predetermined range of the ranked order of the set of items of the search results, facilitating inserting the first item into the predetermined range of the ranked order of the set of items of the search results.

10. The method of claim 8, wherein facilitating inserting, according to the set of rules, the first item into the predetermined range of the ranked order of the set of items of the search results comprises:
facilitating inserting the first item into a predetermined position in the predetermined range of the ranked order of the set of items of the search results.

11. The method of claim 8, wherein facilitating inserting, according to the set of rules, the first item into the predetermined range of the ranked order of the set of items of the search results comprises:
determining when the first item satisfies one or more facet requirements of the search query;
when the first item satisfies the one or more facet requirements of the search query, facilitating inserting the first item into the predetermined range of the ranked order of the set of items of the search results; and
when the first item does not satisfy the one or more facet requirements of the search query, not facilitating inserting the first item into the predetermined range of the ranked order of the set of items of the search results.

12. The method of claim 8, wherein:
the method further comprises:
when the first item of the multiple items is listed in the predetermined range of the ranked order of the set of items of the search results, determining when the first item of the multiple items is listed before a predetermined position in the predetermined range of the ranked order of the set of items of the search results; and
facilitating inserting, according to the set of rules, the first item into the predetermined range of the ranked order of the set of items of the search results comprises:
when the first item of the multiple items is listed in the predetermined range of the ranked order, but is not listed before the predetermined position in the predetermined range of the ranked order of the set of items of the search results, facilitating inserting the first item into the predetermined position in the predetermined range of the ranked order of the set of items of the search results.

13. The method of claim 8, wherein:
the method further comprises providing a software application configured to perform:
when the updated set of rules is different from the set of rules, overwriting the set of rules with the updated set of rules; and
comparing the updated set of rules to the set of rules comprises using the software application to compare the updated set of rules to the set of rules.

14. The method of claim 13, wherein:
the method further comprises:
when the first item of the multiple items is listed in the predetermined range of the ranked order of the set of items of the search results, determining when the first item of the multiple items is listed before a predetermined position in the predetermined range of the ranked order of the set of items of the search results; and
facilitating inserting, according to the set of rules, the first item into the predetermined range of the ranked order of the set of items of the search results comprises:
determining when a current time is after a predetermined start time and before a predetermined end time for inserting the first item into the predetermined range of the ranked order of the set of items of the search results;
when the current time is after the predetermined start time and before the predetermined end time for inserting the first item into the predetermined range of the ranked order of the set of items of the search results, facilitating inserting the first item into the predetermined range of the ranked order of the set of items of the search results;
facilitating inserting the first item into the predetermined position in the predetermined range of the ranked order of the set of items of the search results;
determining when the first item satisfies one or more facet requirements of the search query;
when the first item satisfies the one or more facet requirements of the search query, facilitating inserting the first item into the predetermined range of the ranked order of the set of items of the search results;
when the first item does not satisfy the one or more facet requirements of the search query, not facilitating inserting the first item into the predetermined range of the ranked order of the set of items of the search results; and
when the first item of the multiple items is listed in the predetermined range of the ranked order but is not listed before the predetermined position in the predetermined range of the ranked order of the set of items of the search results, facilitating inserting the first item into the predetermined position in the predetermined range of the ranked order of the set of items of the search results.

15. A method, comprising:
receiving, at a front end server, a search query from a user electronic device;
transmitting, by the front end server, the search query to a first processor of a set of processors;
facilitating, by the first processor, a search of a database comprising item records for multiple items of an online retailer related to the search query;
receiving, at the first processor, search results from the search of the database, the search results comprising, in a ranked order, a set of items of the multiple items of the online retailer related to the search query;
determining, at the first processor, when a first item of the multiple items is listed in a predetermined range of the ranked order of the set of items of the search results;
when the first item of the multiple items is not listed in the predetermined range of the ranked order of the set of items of the search results, facilitating inserting, at the first processor and according to a set of rules, the first item into the predetermined range of the ranked order of the set of items of the search results;
transmitting, from the first processor to the front end server, the search results with the first item listed in the predetermined range of the ranked order of the set of items of the search results;
coordinating displaying, by the front end server, the search results on a graphical user interface of the user electronic device with the first item listed in the predetermined range of the ranked order of the set of items of the search results;
receiving, at the first processor, an updated set of rules;
comparing, at the first processor, the updated set of rules to the set of rules to determine when the updated set of rules is different from the set of rules;
when the updated set of rules is different from the set of rules, transmitting, from the first processor, the updated set of rules to a key value database; and
coordinating displaying, by the front end server, a modified version of the search results on the graphical user interface of the user electronic device according to the updated set of rules.

16. The method of claim 15, wherein facilitating inserting, at the first processor and according to the set of rules, the first item into the predetermined range of the ranked order of the set of items of the search results comprises:
determining, at the first processor, when a current time is after a predetermined start time and before a predetermined end time for inserting the first item into the predetermined range of the ranked order of the set of items of the search results; and
when the current time is after the predetermined start time and before the predetermined end time for inserting the first item into the predetermined range of the ranked order of the set of items of the search results, facilitating inserting, at the first processor, the first item into the predetermined range of the ranked order of the set of items of the search results.

17. The method of claim 15, wherein facilitating inserting, at the first processor and according to the set of rules, the first item into the predetermined range of the ranked order of the set of items of the search results comprises:
determining, at the first processor, when the first item satisfies one or more facet requirements of the search query;
when the first item satisfies the one or more facet requirements of the search query, facilitating inserting, at the first processor, the first item into the predetermined range of the ranked order of the set of items of the search results; and
when the first item does not satisfy the one or more facet requirements of the search query, not facilitating inserting the first item into the predetermined range of the ranked order of the set of items of the search results.

18. The method of claim 15, wherein:
the method further comprises:
when the first item of the multiple items is listed in the predetermined range of the ranked order of the set of items of the search results, determining, at the first processor, if the first item of the multiple items is listed before a predetermined position in the predetermined range of the ranked order of the set of items of the search results; and
facilitating inserting, according to the set of rules, the first item into the predetermined range of the ranked order of the set of items of the search results comprises:
when the first item of the multiple items is listed in the predetermined range of the ranked order but is not listed before the predetermined position in the predetermined range of the ranked order of the set of items of the search results, facilitating inserting, at the first processor, the first item into the predetermined position in the predetermined range of the ranked order of the set of items of the search results.

19. The method of claim 15, further comprising:
automatically pulling, by a second processor of the set of processors, the updated set of rules from the key value database;
comparing, by the second processor, the updated set of rules to the set of rules used by the second processor; and
when the updated set of rules is different from the set of rules, overwriting, by the second processor, the set of rules with the updated set of rules on the second processor.

20. The method of claim 15, wherein:
the method further comprises:
when the first item of the multiple items is listed in the predetermined range of the ranked order of the set of items of the search results, determining, at the first processor, if the first item of the multiple items is listed before a predetermined position in the predetermined range of the ranked order of the set of items of the search results;
facilitating inserting, at the first processor and according to the set of rules, the first item into the predetermined range of the ranked order of the set of items of the search results comprises:
determining, at the first processor, when a current time is after a predetermined start time and before a predetermined end time for inserting the first item into the predetermined range of the ranked order of the set of items of the search results;
when the current time is after the predetermined start time and before the predetermined end time for inserting the first item into the predetermined range of the ranked order of the set of items of the search results, facilitating inserting, at the first processor, the first item into the predetermined range of the ranked order of the set of items of the search results;
determining, at the first processor, when the first item satisfies one or more facet requirements of the search query;
when the first item satisfies the one or more facet requirements of the search query, facilitating inserting, at the first processor, the first item into the predetermined range of the ranked order of the set of items of the search results; and
when the first item does not satisfy the one or more facet requirements of the search query, not facilitating inserting the first item into the predetermined range of the ranked order of the set of items of the search results; and
when the first item of the multiple items is listed in the predetermined range of the ranked order but is not listed before the predetermined position in the predetermined range of the ranked order of the set of items of the search results, facilitating inserting, at the first processor, the first item into the predetermined position in the predetermined range of the ranked order of the set of items of the search results; and
the method further comprises:
receiving, at the first processor, the updated set of rules from a configuration processor;
comparing, by the first processor, the updated set of rules to the set of rules to determine when the updated set of rules is different from the set of rules;
when the updated set of rules is different from the set of rules, pushing, by the first processor, the updated set of rules to the key value database;
automatically pulling, by a second processor of the set of processors, the updated set of rules from the key value database;
comparing, by the second processor, the updated set of rules to the set of rules used by the second processor; and
when the updated set of rules is different from the set of rules, overwriting, by the second processor, the set of rules with the updated set of rules on the second processor.

* * * * *